United States Patent [19]

Fenton

[11] 4,356,071

[45] Oct. 26, 1982

[54] THERMALLY STABLE POLYOXYMETHYLENE CONTAINING POLYMERS

[75] Inventor: Jeff T. Fenton, Ponca City, Okla.

[73] Assignee: Conoco Inc., Ponca City, Okla.

[21] Appl. No.: 330,530

[22] Filed: Dec. 14, 1981

[51] Int. Cl.$^3$ .............................................. C08G 2/02
[52] U.S. Cl. .............................. 204/159.21; 528/230; 528/232; 528/270
[58] Field of Search ................... 204/159.21; 528/230, 528/232, 270

[56] References Cited

U.S. PATENT DOCUMENTS

| | | | |
|---|---|---|---|
| 3,242,063 | 3/1966 | Okamura et al. | 204/159.21 |
| 3,312,611 | 4/1967 | Marans et al. | 204/159.21 |
| 3,347,764 | 10/1967 | Matsumoto et al. | 204/159.21 |
| 3,594,293 | 7/1971 | Marans | 204/159.21 |
| 3,963,676 | 6/1976 | Yoshida et al. | 204/159.21 X |
| 4,049,518 | 9/1977 | Ito et al. | 204/159.21 |

*Primary Examiner*—Lucille M. Phynes
*Attorney, Agent, or Firm*—Cortlan R. Schupbach, Jr.

[57] ABSTRACT

A method is provided by which thermally stable polyoxymethylene containing polymers are produced. These polymers are prepared by polymerizing trioxane or formaldehyde which has been first treated with micro-wave radiation. Trioxane or formaldehyde treated in this manner is then suitable for homopolymerization or copolymerization with any of the variety of comonomers known to copolymerize with these materials. The resultant polyoxymethylene containing polymers are of exceptional thermal stability without the necessity of added stabilizers.

7 Claims, No Drawings

THERMALLY STABLE POLYOXYMETHYLENE CONTAINING POLYMERS

This invention relates to a method by which thermally stable polyoxymethylene containing polymers are produced. More specifically, these polyoxymethylene containing polymers are prepared by polymerizing trioxane or formaldehyde which has first been treated with micro-wave radiation. After micro-wave treatment these polymer precursors are then suitable for homopolymerization or copolymerization with any of the widely known comonomers to produce a resultant polymer having exceptional thermal stability without the necessity for any added stabilization.

Polyoxymethylene polymers (also known as acetal polymers, polyacetal polymers, aldehyde resins) have been known for many years. Polyoxymethylene-containing polymers have the general formula $$\text{\textendash}(CH_2O\text{\textendash})_n$$

wherein n is the number of polyoxymethylene units in the polymer. These materials are prepared by the polymerization of formaldehyde or by the polymerization of trioxane, the cyclic trimer of formaldehyde or if copolymers by the additional presence of a comonomer such as ethylene oxide or 1,3-dioxolane. Polyoxymethylene containing polymers prepared in this manner suffer from relatively high thermal instability as measured by the first order rate constant of thermal decomposition at 222° C. under nitrogen (designated $K_{222}$). Without stabilization or modification of some sort most polyoxymethylene containing polymers are too unstable to be industrially useful. Industrial uses include packaging, gears, cams, tubing and sheet, washers and the like.

Previous attempts to solve this problem in polymers containing groups as described in the formula above include end-capping such polymers in a post-polymerization step, usually with acid anhydrides. This treatment simply slows the polymers decomposition by preventing easy splitting off of formaldehyde groups.

Yet another stabilization method is to copolymerize trioxane with monomers which impart thermal stability to the polymer. Comonomers in such cases include cyclic ethers such as ethylene oxide or cyclic acetals such as 1,3-dioxolane. Such comonomers of polyoxymethylene polymers are described in U.S. Pat. Nos. 2,989,509 and 3,027,352 hereby incorporated by reference into the instant specification. An excellent brief description of these polymers can be found in the Kirk-Othmer Encyclopedia of Chemical Technology Volume 1, page 112 to 123, 3rd Edition, 1978.

Usually trioxane is polymerized by a cationic mechanism, while formaldehyde is catalyzed by anionic mechanisms. Preferred catalysts are coordinate complexes of boron trifluoride such as boron trifluoride ethyl etherate and similar Lewis acids. In addition, other compounds will effect polymerization such as boron trifluoride gas, aluminum trifluoride, diazonium salts, acetyl perchlorate, hydrogen fluoride and fluorosulfuric acid, and anionic catalysts such as amines, phosphines, ammonium salts, sulfonium salts, amides and amidines.

Much art exists dealing with stabilizing polyoxymethylene containing polymers using ionizing radiation. Representative but non exhaustive examples of such references are U.S. Pat. No. 3,203,841 which teaches the use of polyoxymethylene as a binder for explosive compositions. The trioxane is polymerized by ionizing radiation. U.S. Pat. No. 3,242,063 teaches the radiation-induced polymerization of trioxane using high energy ionizing radiation. U.S. Pat. No. 3,305,464 teaches the radiation-induced polymerization of trioxane using a radiation at reduced temperature. U.S. Pat. No. 3,312,611 shows trioxane radiated with high energy ionizing radiation which produces a fine size fiberous polyoxymethylene polymer. Also taught are alpha particles, deutrons, neutrons, and radioactive isotopes.

U.S. Pat. No. 3,347,764 teaches a method of polymerization utilizing trioxane, a solvent and ionizing radiation in the absence of a catalyst. U.S. Pat. No. 3,366,561 teaches the use of ionizing radiation to polymerize trioxane while using a copolymerizable stabilizing comonomer. U.S. Pat. No. 3,438,883 teaches the use of high energy ionizing radiation to produce a high molecular weight fiber. U.S. Pat. No. 3,616,368 teaches the high energy radiation polymerization of polyoxymethylenes by first radiating the trioxane with ionizing radiation and then contacting with nonradiated trioxane or tetraoxane. U.S. Pat. No. 3,860,562 utilizes both ionizing radiation and acetic anhydride end groups. U.S. Pat. No. 3,963,676 teaches the use of electron acceptor substances together with high energy ionizing radiation to produce a thermally stable material. U.S. Pat. No. 4,049,518 teaches a multi-step radiation process to produce a polymer having thermal stability.

In addition, Japan Kokai No. 7483740 shows the treatment of an oxymethylene copolymer with unstable end groups in the presence of a solvent having a dielectric loss of greater than one with micro-wave radiation to stabilize such copolymers. The copolymer, ethylene oxide-s-trioxane was placed in a glass container and heated to yield a more thermally stable material.

However, these methods are disadvantageous commercially since radiation is not economical when a large bulk of the monomer is treated on an industrial scale because of the extremely large radiation equipment needed and of the prolonged time required for such radiation. In addition, it would be preferred to provide a method for stabilizing polyoxymethylene-containing polymers which does not require post treatment or added stabilizers in order to reduce cost and promote effectiveness.

It would therefore be of great benefit to provide a simple and effective method of producing thermally stable polyoxymethylene containing homopolymers and copolymers without the need of multiple step polymerizations, massive equipment or added stabilizers.

It has now been discovered according to the present invention that stable polyoxymethylene-containing polymers can be produced by first treating the precursor formaldehyde or trioxane or mixtures of these with microwave radiation prior to use in a polymerization reaction. The present invention is useful for all known polymerization reactions in which polyoxymethylene-containing polymers are formed, including homopolymers and all polymerizable comonomers with these polyoxymethylene groups in the polymer chain. The effect of the micro-wave radiation upon the trioxane and/or formaldehyde is not known but a sharp increase in thermal stability is the result of such treatment. The micro-wave treatment has no detrimental effect on subsequent polhmerizations carried out with materials treated, regardless of polymerization conditions, catalysts or comonomers used.

Micro-wave radiation as used in this specification and claims is defined in Van Nostrands Scientific Encyclopedia, 1958, as extending from 300,000 MHz to 1000 MHz or 1 millimeter (mm) to 30 centimeters (cm) in wavelength. Micro-wave frequencies between 2000 and 3000 $MH_2$ are preferred.

It is preferred but not critical that the microwave treatment of the present be carried out under an inert atmosphere. Any atmosphere inert with respect to the trioxane and/or formaldehyde is suitable but most preferred would be nitrogen and the nobel gases such as argon, xeon, helium, krypton, and radon, or mixtures of these.

In general, the micro-wave treatment of the materials prior to polymerization is carried out for an effective length of time. Normally, since micro-wave treatment is carried out from a time ranging from about 1 second to about 20 minutes, but normally from about 1 minute to about 10 minutes is sufficient.

It is preferred that the formaldehyde and/or trioxane treated by anhydrous in order to produce a more thermally stable polymer. The use of anhydrous materials is simply preferred and is not critical to improving thermal stability of the polymers obtained.

The micro-wave radiation can be used at any desired wattage, but normally the higher the wattage to produce the micro-wave radiation the more quickly the effective level of treatment can be reached. Normally, micro-wave projectors are available in the wattage range of from about 450 to about 700 watts.

The micro-wave radiation of the present invention can be clearly distinguished from ionizing radiations of the prior art. Ionizing radiation can be broken down into particulate and non-particulate radiation. Particulate radiation is that generated from electronic accelerators such as the Van de Graaff accelerators, residence transformers, linear accelerators, insulated core transformers, radioactive elements such as cobalt 60, strontium 90 and the like. Non-particulate ionizing radiation are sources which emit radiation in the range from about $10^{-3}$ angstroms to about 2000 angstroms. Suitable sources of such non-particulate ionizing radiation are vacuum ultraviolet lamps such as xenon or krypton arcs and radioactive elements such as cesium 137, strontium 90, and cobalt 60. The nuclear reactors are also known to be a useful source of ionizing radiation. These radiations are completely distinguishable from the microwave radiations of the present invention.

The materials of the present invention are, in general, polyoxymethylene containing polymers, whether homopolymers or copolymers containing polyoxymethylene units, such as the ethylene oxide containing and 1,3 dioxolane containing polymers. The present invention is effective at all levels of copolymerization, although clearly the greatest effect will be apparent when the polymer contains a large number (80% and higher) oxymethylene units.

The invention is more concretely described with reference to the examples below wherein all parts and percentages are by weight unless otherwise specified. The examples are provided to illustrate the present invention and not to limit it.

In all experiments set forth below, the microwave source used was a commercial micro-wave (Kenmore, trademark of and sold by Sears and Co. having a frequency of 2450 MHz) which had been equipped to allow an inert gas flow over the contained material.

EXAMPLE 1

A 100 milliliter (ml) three neck round bottom flask containing 12.93 grams of trioxane was placed in the microwave oven and equipped such that it could be flushed continuously with argon. The microwave treatment was carried out for three 5-minute periods, after which 10.07 grams of trioxane remained. Ten ml of cyclohexane was added along with 0.85 ml of 1,3-dioxolane. The solution was dissolved at a temperature of 56° C. with stirring. A catalyst (11 microliters of $BF_3.OEt_2$) was added and polymer began to form in 2 to 3 minutes. After 4 minutes the flask was removed from a heating mantel and allowed to stand for 2 hours. A dry polymer (6.82 grams) was collected which showed an initial weight loss of 10% upon heating to 222° C. a ½% weight loss after 5 minutes of heating at 222° C. and thereafter showed only approximately a ½% weight loss after heating for 1 hour. The polymer had a melting point of 167° C. and a $K_{222}$ of 0.0177 weight percent per minute, as determined by heating to 222° C. under nitrogen.

EXAMPLE 2

A comparative example was carried out wherein 13.0 grams of trioxane was mixed with 0.85 ml of 1,3-dioxolane and 13 ml of cyclohexane, which was solution polymerized by 11 microliters of $BF_3.OEt_2$ at 55° C. The polymer was obtained which was allowed to stand for 1½ hours without external heating and showed 14% weight loss upon heating to 222° C. under nitrogen. After maintaining temperature at this level for another hour, the polymer lost an additional 13.4% in weight. Polymer loss corresponded to a $K_{222}$ of 0.181 weight percent per minute. The polymer had a melting point of 167° C.

Although the trioxane of the comparative examples was passed through a mole sieve, the microwave treatment of the present invention can be carried out on non-treated materials with equally advantageous results.

While certain embodiments and details have been shown for the purpose of illustrating this invention, it will be apparent to those skilled in this art that various changes and modifications may be made herein without departing from the spirit or scope of the invention.

I claim:

1. A method for producing thermally stable polyoxymethylene-containing polymers formed by the polymerization of formaldehyde and/or trioxane, the method comprising treating said formaldehyde and/or trioxane with microwave radiation prior to use in a polymerization reaction.

2. A method as described in claim 1 wherein said microwave treatment is carried out under an inert atmosphere.

3. A method as described in claim 2 wherein said microwave treatment is carried out for a time ranging from about 1 second to about 20 minutes.

4. A method as described in claim 3 wherein said radiation is substantially in the wavelength range of from about 1 mm to about 30 mm.

5. A method as described in claim 4 wherein the formaldehyde is anhydrous formaldehyde.

6. A method as described in claim 2 wherein the inert atmosphere is selected from the group consisting of nitrogen, argon, xeon, helium, krypton and radon and mixtures of these.

7. A method as described in claim 4 wherein the microwave radiation is produced at a wattage of from about 400 watts to about 700 watts.

* * * * *